United States Patent [19]
Peeler

[11] 3,784,224
[45] Jan. 8, 1974

[54] PASSENGER SAFETY DEVICE
[75] Inventor: Donald H. Peeler, Raleigh, N.C.
[73] Assignee: Irvin Industries Inc., Greenwich, Conn.
[22] Filed: Dec. 8, 1971
[21] Appl. No.: 205,914

[52] U.S. Cl. .............................. 280/150 B, 297/390
[51] Int. Cl. .......................................... B60r 21/02
[58] Field of Search.................... 297/390, 384, 148; 280/150 B, 150 SB

[56] References Cited
UNITED STATES PATENTS
3,424,497  1/1969  Brilmyer............................ 297/384

FOREIGN PATENTS OR APPLICATIONS
1,003,534  6/1964  Great Britain ................. 280/150 B Primary Examiner—Robert R. Song
Attorney—John M. Rommel, Joseph A. De Grandi and Richard G. Kline

[57] ABSTRACT

A safety seat and safety cushion which are preferably used in combination with each other and with a safety belt as a passenger safety device for protection of a child during vehicular travel.

8 Claims, 6 Drawing Figures

INVENTOR
Donald H. Peeler

INVENTOR
Donald H. Peeler

BY Rommel and Rommel
ATTORNEYS

INVENTOR

Donald H. Peeler

BY Rommel and Rommel

ATTORNEYS

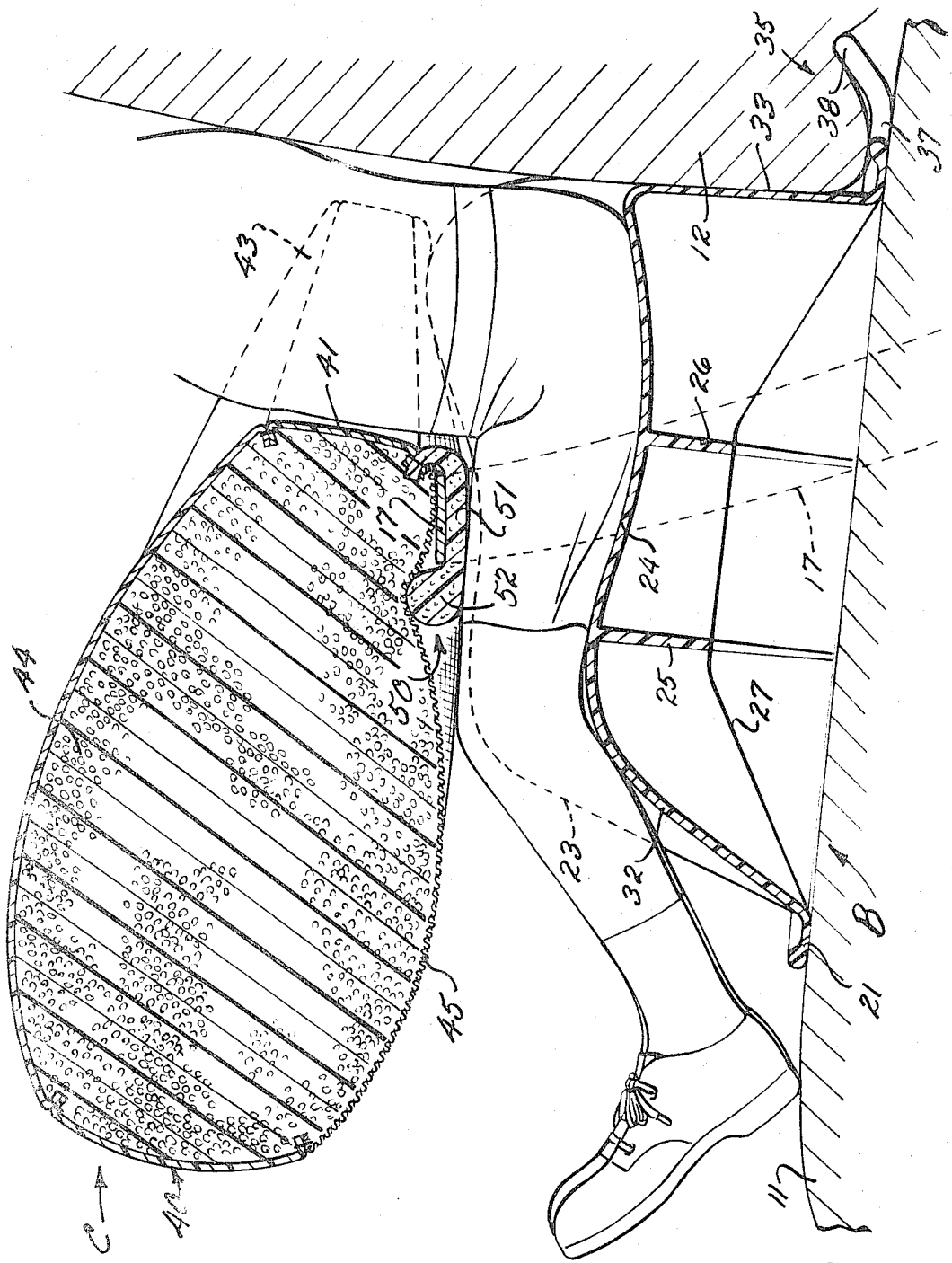

3,784,224

PASSENGER SAFETY DEVICE

DISCLOSURE

This invention relates to improvements in passenger safety devices.

This invention has been primarily developed in connection with protection of children riding in an automobile and will therefore be described in this association. However, it is to be specifically noted that the invention is not so limited and may be used for other purposes in various situations. Also, the invention was primarily developed in connection with use of a safety seat and safety cushion in combination with each other and with a safety belt. However, it is obvious that safety seat and safety cushion may be used separately. For instance, the safety seat alone might be used in cases wherein a shoulder harness is available, the safety seat lifting the child to a position where the shoulder harness might be properly used. In some instances it may also be desirable to eliminate use of the safety seat and to merely use the safety cushion. Thus, it is well within the scope of the present invention to use the safety seat and safety cushion in combination or to use them separately.

The primary object of this invention is the provision of a safety seat and safety cushion which may be used either separately or in combination as a passenger safety device for protection during vehicular travel.

Other objects and advantages of the invention will become apparent during the course of the following detailed description, taken in connection with the accompanying drawings and in which drawings:-

FIG. 6 is a transverse sectional view taken through my improved safety seat and safety cushion as they may be used in combination.

Figure 1:
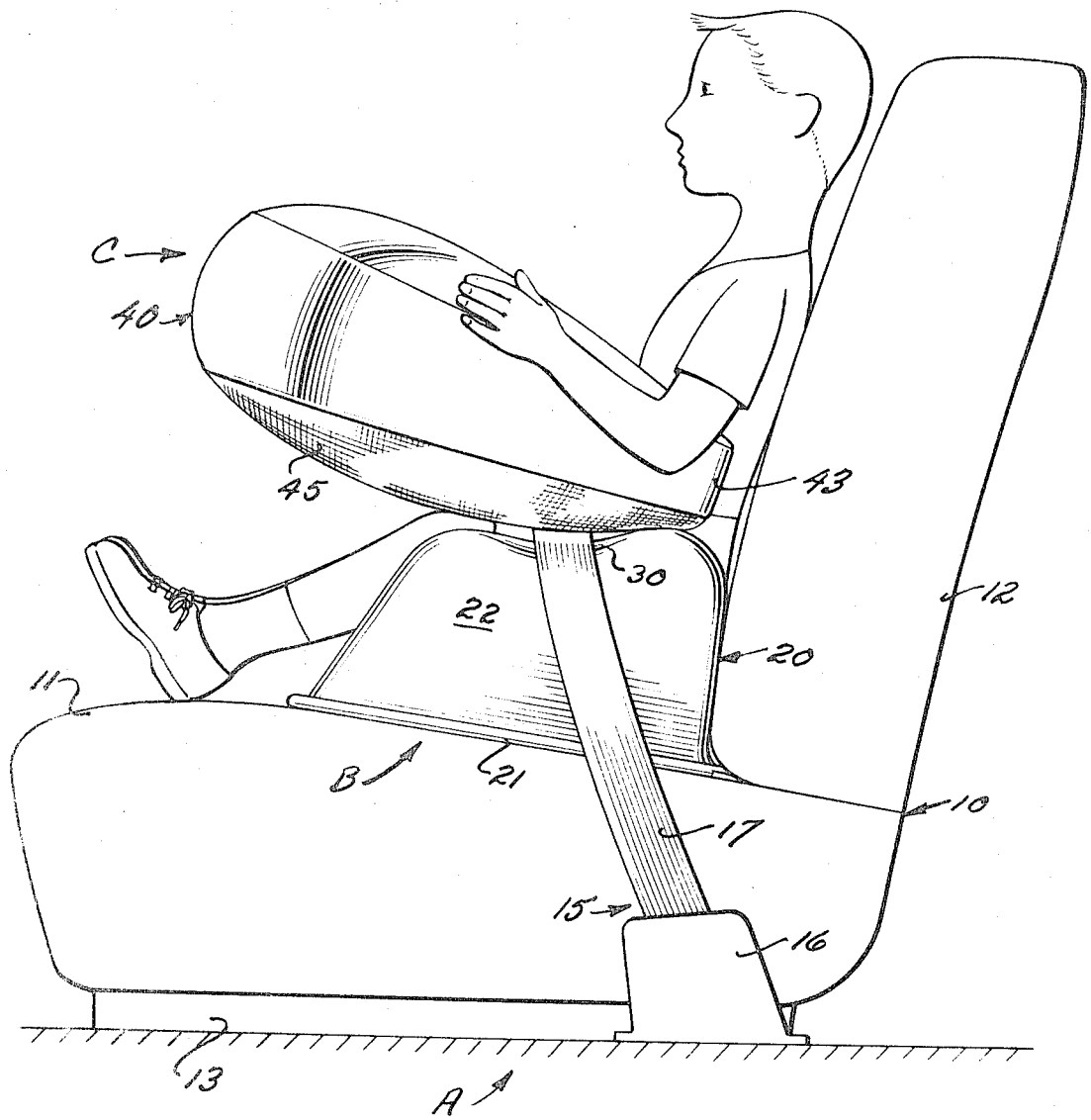
FIG. 1 is a side view showing use of my improved safety seat and safety cushion in combination as a passenger safety device for protection of a child during vehicular travel.
Figure 2:
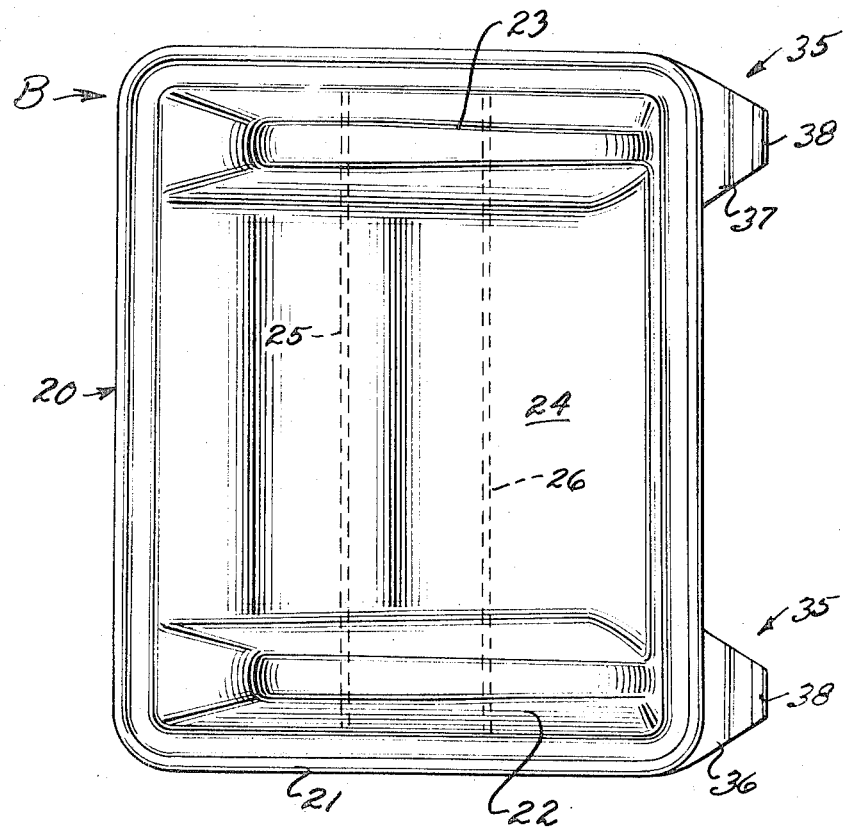
FIG. 2 is a top plan view of my improved safety seat.

In the drawings, wherein for the purpose of illustration is shown a preferred embodiment of the invention, and wherein similar reference characters designate corresponding parts throughout the several views, the letter A may generally designate the vehicle seat and associated structure in combination with which my improved safety seat B and safety cushion C may be used.

Vehicle seat and associated structure A may include a vehicle seat 10 having a seat cushion 11 and a seat back 12 which may be suitable attached to a base 13, as is well known in the art. The vehicle may also include safety belt means 15, which may include such as a retractor 16 or other means for attachment thereof directly to the vehicle, a safety belt 17 being provided which may be secured about a passenger's waist, in a conventional manner and as is well known in the art.

Safty seat B preferably includes a body portion 20 having a base portion 21, a pair of upstanding side portions 22 and 23, and a seat portion 24 which extends between side portions 22 and 23 for raising an occupant thereof above the surface of the vehicle seat. The safety seat B is preferably of a size to be readily received on a vehicle seat with the base thereof resting on the seat cushion 11.

Side portions 22 and 23 preferably extend a sufficient distance above seat portion 24 to provide a degree of restraint against sidewise movement of a passenger seated on seat 24 and are preferably contoured for occupant comfort. Safety seat B is preferably of substantially rigid material and may be provided with reinforcing ribs 25, 26 and 27.

Figure 3:
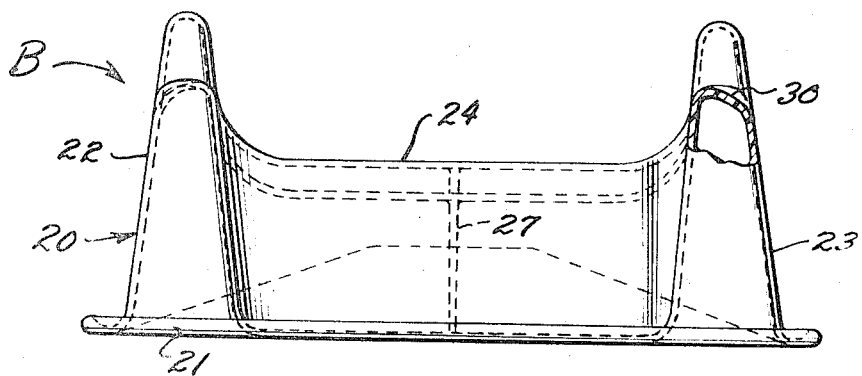
FIG. 3 is a front view of my improved safety seat, with parts thereof broken away to show preferred details.
Figure 4:
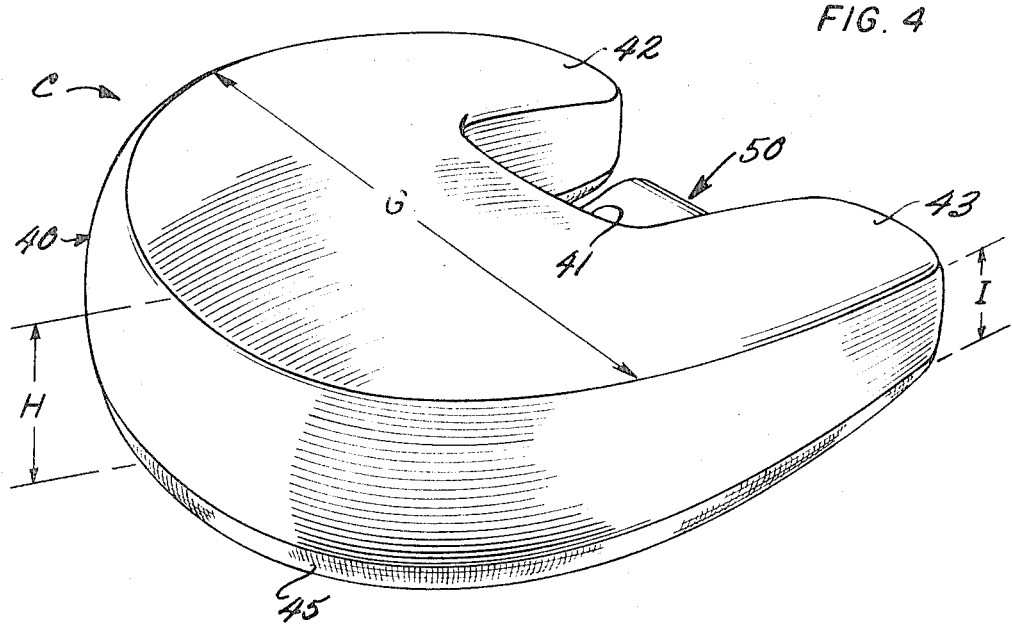
FIG. 4 is a perspective view of my improved safety cushion.
Figure 5:
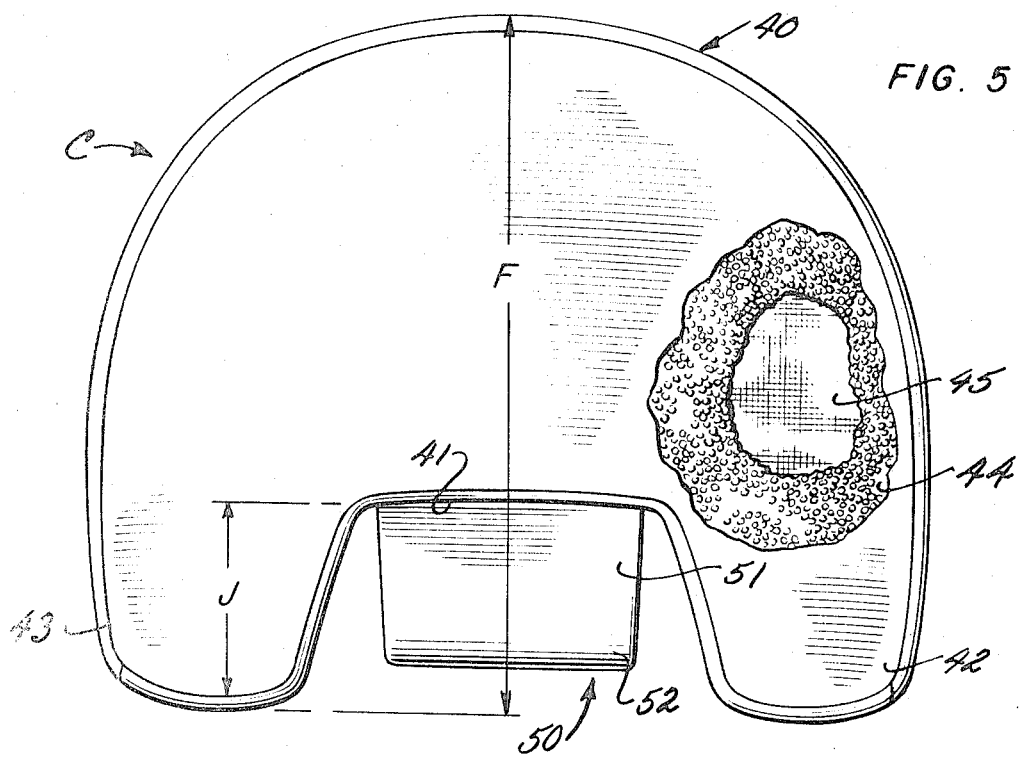
FIG. 5 is a top plan view of my improved safety cushion, with parts thereof broken away to show preferred details.

As best shown in FIGS. 1 and 3, the intermediate portion of side portions 22 and 23 is preferably angled downwardly as at 30, from the inner side of each side portion toward base 21 at the outer side portion thereof. This provides a portion over which belt 17 may pass and which provides a safety belt engaging portion of the safety seat to inhibit sidewise shifting of the same with respect to the vehicle seat.

Seat portion 24 may be provided with an inclined front portion 32 over which an occupant's legs may comfortably pass, and may have a rear portion 33 positioned for abutment against seat back 12.

Safety seat B may be provided with restraint means 35, which may comprise a pair of spaced apart members 36 and 37, adjacent each side of body portion 20, extendant outwardly from the rearward portion thereof and terminating in an upstanding portion 38. As is best shown in FIG. 6, restraint means 35 are preferably positioned to abut the lowermost portion of seat back 12, inwardly from the occupant engaging surface thereof, being substantially clamped between the lowermost portion of seat back 12 and the upper surface of seat cushion 11, to inhibit movement of safety seat B away from seat back 12. Upstanding portion 38 will thus usually be substantially interlocked behind the seat back spring frame (not shown) with which vehicle seats are customarily provided.

Safety cushion C preferably includes a substantially pillow-like resilient body portion 40 having a centrally disposed recessed portion 41 at one end thereof into which an occupant may be received with wings 42 and 43 thereof extending adjacent each side thereof. Body portion 40 may be provided with any appropriate filler 44, expanded Polystyrene beads for instance, or it may be an inflatable member. Lower portion 45 thereof is preferably provided with a substantially porous covering which permits escape of air from the safety cushion on occupant impact thereagainst and also provides for at least minimal ventilating capabilities when the safety cushion is placed over the upper leg portion of an occupant.

Safety cushion C is preferably designed to provide for equal loading to reduce the potential of back and/or neck injury on impact thereagainst and to also protect against oblique collisions. The various characteristics of the bag will vary according to the purposes for which it will be used, but certain minimal characteristics are desirable even when used for very small children. I estimate that such minimal characteristics will be as follows:-

Minimum overall length F of 10 inches.
Minimum width G of 8 inches.
Minimum thickness H of the outer end thereof of 4 inches.

Minimum thickness I adjacent the occupant receiving portion thereof of 2 inches.

Minimum depth J of 2 inches for occupant recessed portion 41.

Minimum volume of one cubic foot.

When provided with a filler such as polystyrene beads, it preferably has a minimum density of 6/10 of a pound per cubic foot.

Safety cushion C is preferably provided with attaching means 50 which is preferably suitably adapted for association with appropriate restraint means of a vehicle seat in maintaining safety cushion C in proper position with respect to an occupant. As shown, attaching means 50 preferably includes an elongated tongue portion 51 having one end thereof attached to body portion 40 of safety cushion C and, as shown in FIG. 6, is of sufficient length for entraining about safety belt 17 and having an enlarged outer end portion 52 which inhibits removal of the tongue portion from between seat belt 17 and an occupant unless the seat belt is loosened or unfastened. For occupant comfort and to spread the load, elongated tongue 51 may be a hard neoprene sponge foam member and the enlarged outer end 52 thereof may comprise a foam rubber roll.

As previously described, although not shown, it is perfectly obvious that safety seat B and safety cushion C may be used either separately or in combination, for passenger restraint. When used in combination, safety belt 17 comprises a means for securing safety seat B and safety cushion C in contiguous association with respect to each other, vehicle seat 10 and an occupant of safety seat B for protective restraint of such occupant.

Various changes may be made to the form of invention herein shown and described without departing from the spirit of the invention or the scope of the following claims.

I claim:

1. A safety device for use in combination with a vehicle seat, said safety device including a safety seat and a safety cushion, said safety seat including a body portion having a base and a seat portion, said body portion being of a size to be received on said vehicle seat and said seat portion being positioned thereon so that an occupant thereof is positioned above the upper surface of said vehicle seat, said safety cushion including a pillow-like resilient body portion for positioning adjacent the waist of a safety seat occupant and extendant over at least the upper leg portion of a safety seat occupant and comprising an energy absorbing medium for absorption of the energy of impact of an occupant thereagainst, said body portion of said safety cushion having a minimum volume of one cubic foot of an energy absorbing material, the bulk of which is distributed about the area of occupant impact thereagainst, and having an air release portion to permit escape of air from said safety cushion on occupant impact thereagainst, said air release portion comprising means for escape of air from said safety cushion at a rate to minimize the rebound characteristics of said safety cushion, and means for securing said safety seat and said safety cushion in contiguous association with respect to each other, said vehicle seat and an occupant of said safety seat for protective restraint of such occupant.

2. A safety device as specified in claim 1 wherein said body portion of said safety cushion is provided with a recessed portion for interfitting about an occupant with portions thereof extending to each side of an occupant.

3. A safety device as specified in claim 2 wherein said recessed portion is offset a minimum of two inches from the adjacent end of the portions extending to each side thereof.

4. A safety device as specified in claim 1 wherein said last means comprises a safety belt associated with said vehicle seat and said safety cushion includes attaching means for attachment to said seat belt in maintaining said safety cushion in proper position with respect to an occupant of said safety seat.

5. A safety device for use in combination with a vehicle seat having a safety belt associated therewith, said safety device including a safety seat and a safety cushion, said safety seat including a body portion having a base and a seat portion, said body portion being of a size to be received on said vehicle seat and said seat portion being positioned thereon so that an occupant thereof is positioned above the upper surface of said vehicle seat, said safety cushion including a pillow-like resilient body portion for positioning adjacent the waist of a safety seat occupant and extendant over at least the upper leg portion of a safety seat occupant, and attaching means for attachment thereof to said seat belt in maintaining said safety cushion in proper position with respect to an occupant of said safety seat, said attaching means including an elongated tongue portion having one end thereof attached to said body portion of said safety cushion, said tongue portion being of sufficient length for entraining about said seat belt between said seat belt and an occupant of said safety seat and having an enlarged outer end portion which inhibits removal of said tongue portion from between said seat belt and an occupant of said safety seat unless the seat belt is loosened or unfastened, said safety belt comprising means for securing said safety seat and said safety cushion in contiguous association with respect to each other, said vehicle seat and an occupant of said safety seat for protective restraint of such occupant.

6. A safety cushion for use in combination with a seat having a safety belt associated therewith, said safety cushion including a pillow-like resilient body portion for positioning adjacent the waist of a seat occupant and extendant over at least the upper leg portion of a seat occupant and having attaching means for attachment to said seat belt in maintaining said safety cushion in proper position with respect to an occupant, said attaching means including an elongated tongue portion having one end thereof attached to said body portion of said safety cushion, said tongue portion being of sufficient length for entraining about said seat belt between said seat belt and an occupant and having an enlarged outer end portion which inhibits removal of said tongue portion from between said seat belt and an occupant unless the seat belt is loosened or unfastened.

7. A safety device as specified in claim 1, wherein said body portion of said safety cushion includes a lower porous surface which comprises said air release portion thereof, and also comprises means for at least minimal ventilating capabilities for the upper leg portion of an occupant over which the same extends.

8. A safety device as specified in claim 1, wherein said safety cushion has a minimum overall length of ten inches and width of eight inches, minimum thickness of two inches at the end thereof adjacent the waist of a safety seat occupant, and a minimum thickness of four inches at the other end thereof.

* * * * *